United States Patent [19]

Byrum

[11] Patent Number: 4,700,540

[45] Date of Patent: Oct. 20, 1987

[54] COLLAPSIBLE SELF-RECOVERING CYLINDER DISCRETE IMPULSE MOTOR

[76] Inventor: Baney L. Byrum, 34-B Fenway South, Baltimore, Md. 21221

[21] Appl. No.: 691,873

[22] Filed: Jan. 16, 1985

[51] Int. Cl.$^4$ .............................................. F04B 17/00
[52] U.S. Cl. ...................................... 60/325; 60/413; 417/229
[58] Field of Search ......................... 60/325, 413, 486; 417/229, 476

[56] References Cited

U.S. PATENT DOCUMENTS

| | | | |
|---|---|---|---|
| 792,839 | 6/1905 | Neathery et al. | 417/229 |
| 2,020,361 | 11/1935 | Johnston | 417/214 |
| 3,088,417 | 5/1963 | Johnston | 417/229 |
| 3,803,422 | 4/1974 | Krickler | 417/229 X |
| 4,309,150 | 1/1982 | Payne | 417/229 |
| 4,339,920 | 7/1982 | Le Van | 417/229 X |
| 4,409,489 | 10/1983 | Hayes | 417/229 X |

*Primary Examiner*—Gerald A. Michalsky
*Attorney, Agent, or Firm*—Epstein & Edell

[57] ABSTRACT

This invention is an impulse-driven power-generating pump having a collapsible self-restoring "cylinder" subjected externally to discrete impulses which reduce the volume of the "cylinder" thereby displacing fluid therefrom. The impulses may derive from a moving or changing weight or other force-producing means. In particular, the event of railroad traffic is used, the fluid being hydraulic and the discrete impulses being produced by the wheel flanges of passing trains. These impulses act on one or more pumping components each comprising a hydraulic fluid container having a collapsible wall with or without resilience, a length less than the minimum distance between adjacent train wheel axles, a width less than the distance between rails, an inside height of approximately one inch, and an overall height of less than six and one-half inches including the emplacement and supporting structure. Each pumping component deforms incrementally due to the effective weight and motion of the train wheel flange upon it, the deformation practically shutting off fluid flow in the pumping component except in the direction of flange motion, and the deformed portion recovers its design geometry by virtue of its internal fluid pressure and/or its resilience as the flange moves along the length of the pumping component depressing other portions thereof. The resulting fluid flow is compelled to pass through an actuator and upon leaving same to return directly to recovering portions of the pumping component or to return there via an accumulator after storage therein for an interval of time.

10 Claims, 13 Drawing Figures

COLLAPSIBLE SELF-RECOVERING CYLINDER DISCRETE IMPULSE MOTOR

BACKGROUND

1. Technical Field

Most previous inventions for producing power by means of wheeled vehicle traffic flow are based on wheels actuating conventional pistons in conventional cylinders or actuating other mechanical linkage by various means each employing either the treadle principle or the roller principle.

Wheels per se or the effective weight thereof or the effective weight of other things, including fluids, or the effective force produced by other means, including fuels, acting as external pistons to pressurize directly or indirectly the fluid in cylinders comprising resilient structure, fluid action being achieved by deformation and recovery of the cylinder, have not been previously used for the production of power which is specifically addressed by the present invention.

2. Prior Art

Extant patents based on the treadle principle are:

(1) U.S. Pat. No. 792,839 (Pumping Mechanism) issued June 20, 1905 to J. C. Neathery and J. M. Adams describes a hydraulic pump actuated by vertically-movable train rail sections;

(2) U.S. Pat. No. 2,020,361 (Air Compressor) issued Nov. 12, 1935 to W. H. Johnston describes an air compressor actuated by vertically-movable auto road sections;

(3) U.S. Pat. No. 3,088,417 (Apparatus For Pumping Fluids) issued May 7, 1963 to Curtis D. Johnston describes a hydraulic pump actuated by a rocking platform placed in auto roadways; and (4) U.S. Pat. No. 3,803,422 (Displacement Hydro Electric Generator Apparatus) issued Apr. 9, 1974 to Frank Krickler describes a hydraulic pump actuated by wheeled vehicles passing over vertically-movable ramps.

Extant patents based on the roller principle are:

(5) U.S. Pat. No. 1,312,131 (Automatic Rail Power) issued Aug. 5, 1919 to Burris M. Morton describes a power generator driven by the motion of shafts journaled adjacent to the train track and actuated by the depressions to horizontal orientations of upstanding arms distributed along the train track, said arms being engaged and depressed by the wheels of passing trains; and (6) U.S. Pat. No. 3,885,163 (Expressway Power Generating System) issued May 20, 1975 to Charles E. Toberman describes a power generator driven by the rotation of rollers having fins protruding above the surface of auto road sections, said rollers being distributed in auto roadways where they are actuated by impulses from the tires of passing vehicles.

Extant patent based on resilient structure deformed by the weight of passing vehicles is:

(7) U.S. Pat. No. 1,999,661 (Signal Controlling Apparatus) issued Apr. 30, 1935 to Boris V. Nagashev describes a switch control mechanism actuated hydraulically by the deformation of a resilient structure filled with fluid and located beneath resilient (Macadam or concrete) auto road sections.

There is no net flow of fluid in the switch control device of item (7) above, just a pressure wave and/or a fluid oscillation in the segment of conduit joining the impulse and switch stations. Also, in this same category, there are a variety of traffic-responsive fluid-actuated devices; e.g., bell ringers commonly used at auto service stations and other places of business as alerting signals, counters used to determine the number of autos passing a specific location in a certain period of time, the data being used as inputs to various traffic studies, and special shock-absorbing bumps invented to replace conventional hard bumps installed in certain areas to make auto drivers decelerate to safe speeds.

There are several other patented means of recovering energy from vehicles passing, most of which are so similar in principle to those discussed above as to make them redundant. A few, however, are basically different; e.g., one of them discloses an auto-carried electrical system actuated by passage of the vehicle over bumps, in effect saving some of the energy of the shock absorption system, although tire deflection is used.

PURPOSE AND SUMMARY

The primary purpose of the present invention, called a pug motor, is to save some of the gravitational energy that is ordinarily lost when the force on a specific place due to the weight of an arbitrary mass there changes in some sort of time sequence and the discrete impulses produced thereby can be applied to a pumping component of the pug motor without causing undesirable changes in the energy of the mass.

In the pug motor, there is a loop through which fluid is pumped and compelled to drive an actuator by a pumping component comprising interconnected fluid containers having collapsible walls that are resiliently and/or fluid pressure restoring. The novel pumping component is in principle a self-recovering "cylinder" which when subjected to a suitable process of deformation and release by any of a great variety of objects acting as external "pistons" can produce a pumping action similar to that of the heart but not necessarily periodic. A pumping component having a reasonable economic life is essential to the success of the pug motor and, although simple in principle, achievement of a feasible pumping component will require research, development, and experimental design.

A multitude of suitable "pistons" exist to drive the self-recovering "cylinder" of the pug motor. It can be driven by all types of events having the capability of producing discrete impulses of suitable size in various time sequences; e.g., auto traffic (especially that at toll booths, parking areas, and refueling stations), people or animals in motion or waiting (especially those moving about in well defined places or just being there for awhile and then leaving), passenger and/or freight elevators (especially those that stop and start frequently), the operation of weighing scales (especially those used for trucks or other heavy loads), traffic at dump sites, tidal or similar man-made water-depth changes, and the familiar cycle of events repeated with variations with many things in temporary storage or waiting in a well defined place for awhile before disposition elsewhere. It can also be driven by fuel combustion, of course, the pumping component being enclosed in a suitable chamber. If feasible, the fuel-powered pug motor may be useful in boats, e.g., the working fluid being water or air acting as a direct jet or as a propeller driver.

The major advantage of the pug motor is more pump for less money. Obviously, the cost of design, construction, installation, and operation of collapsible "cylinders" that are compatible with such a wide variety of existing "pistons" is much cheaper than conventional cylinders and pistons. As for its utility, the energy that could be saved by a single pug motor would be almost immediately remarkable in some instances and the accrued savings of many pug motors would be very significant in just a few years of operation. After the initial investment was regained, the energy saved by the weight-powered pug motor would be free, in a sense, because operating costs would be practically nil. More importantly, operation of the pug motor would not pollute the environment. Furthermore, judging from the present state of the art in materials, in general, and collapsible conduits, in particular, another important factor is that an acceptable economic life of the collapsible cylinder could apparently be achieved with modest research, development and experimental design in most weight-powered applications of the pug motor. The feasibility of a collapsible cylinder pumping a working fluid by means of burning fuel outside the cylinder is not as apparent as that of the weight-powered application and is at least an order of magnitude more difficult to evaluate.

In the embodiment described below, novel features of the pug motor are enhanced by the fact that it can readily be incorporated into the existing railroad system as a useful power generating device. Furthermore, its performance can be improved by minor changes in a few standard equipments and practices; e.g., by increasing flange heights one or two inches and modifying flange geometry to better actuate the emplaced pumping component.

DESCRIPTION

Drawings

The pug motor will hereinafter be further described with reference to the accompanying drawings, in which.

CONSTRUCTION AND OPERATION

Figure 1:
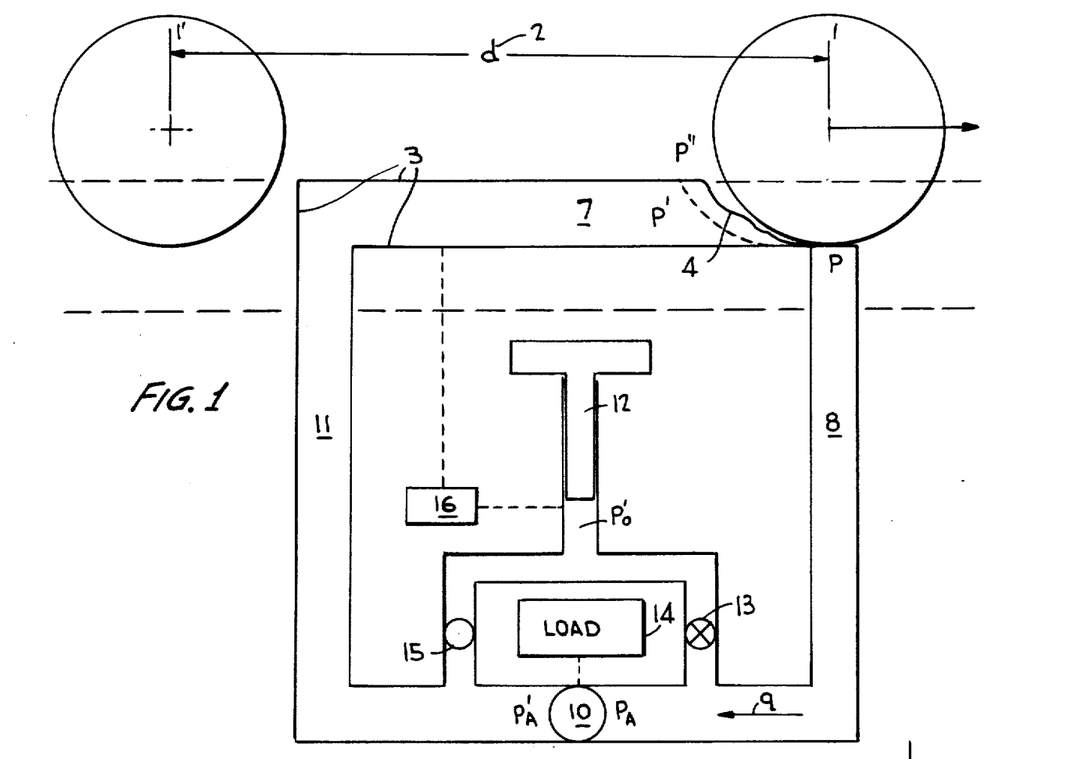
FIG. 1 is a schematic diagram of a pub motor having one pumping component interacting with a train wheel flange and drawing a reversible actuator.

In FIG. 1, pumping component 7 is the "cylinder" of a positive constant displacement pump comprising a conduit of length $L<d$ having a collapsible "inexpansible" structure with resilience $e \geq 0$. Any given wheel flange 1,1' on a railroad car or locomotive may be the "piston" corresponding to said cylinder. The pointers from numeral 6 in FIG. 1 denote the top and bottom of the inside wall (i.e., the car-axle side) of the single rail along which lies component 7. FIG. 1 pertains to reversible actuators and single-cylinder pug motors but, if desired, various valve designs and plumbing arrangements can be used to accommodate nonreversible actuators and compound pug motors; e.g., see FIGS. 4, 5, 6 & 9.

As a train having speed v in the direction indicated by the numeral 5 in FIG. 1 approaches pumping component wall 3 along one of the rails 6 of a two-rail track, a pressure or other suitable switch actuated by the train's presence on the track causes two-way valve 13 to close until the train has passed component 7, at which time valve 13 again opens. Similarly, a train approaching and passing from the right closes and then opens two-way valve 15. Prior to the arrival of flange 1 upon the left end of component 7, said component has its design configuration 3, cylindrical geometry, e.g., and absolute static pressure $p_o > p_a - p_e$ in the hydraulic fluid of loop portions 7, 8, 11 & 12 where $p_a$ is atmospheric pressure and $p_e$ is equivalent net pressure due to resilience e of component 7.

When flange 1 moves upon pumping component 7, absolute pulse pressure in the loop, after transients, because p at the outflow side of said flange, $p_A$ in conduit 8 at actuator 10, $p_A'$ in conduit 11 at actuator 10, $p_o'$ in accumulator 12, p' in the return side of the recovered portion of component 7, and p" in the recovering portion of component 7. Each of these pressures except p" remains fairly constant for a long as there is progressive deformation of pumping component 7 by flange 1.

Component 7 is made, emplaced between the rails, and spaced with respect to the top surface of a rail so that only a safe portion w' of the flange's effective weight W can act upon the pumping component's wall when fully depressed, said w' being sufficient to develop said pressure p and to prevent leakage under the flange to its low pressure side. As shown in FIG. 1, accumulator 12 comprises in principle a tee, placed in the loop between the outflow side of the actuator and the return side of the pumping component, from which a conduit leads to a cylinder wherein a tightly fitted piston rides, the pressure $p_o$ that it is desired to maintain in that part of the loop being equal to the effective weight of the piston divided by the area of the piston.

The magnitude of p is set by actuator 10, a variable displacement hydraulic motor, e.g., in conjunction with load 14 and the feasible operating pressure of pumping component 7. The pressure $p_A$, sufficient to operate actuator 10 under load 14, is less than p due to lost head between flange 1 at its outflow side in component 7 and actuator 10 at its supply side in conduit 8. Pressure $p_A'$, approximately equal to $p_o'$, is set by the lost head across said actuator. Assuming the hydraulic loop to be inexpansible, $p_o'$ is practically equal to static pressure $p_o$ but varies momentarily between $p_o$ and $p_o + \Delta p_o$ approximately where $\Delta p_o$ is an incremental change in $p_o$ which causes the accumulator piston to move up and down seeking its equalibrium position. More specifically, $\Delta p_o$ times the area of the piston is the momentary force imbalance on the piston due to entrance into accumulator 12 or exit therefrom of the fluid displaced by the flangeprint or pug on component 7, e.g., said fluid being the volume that would be displaced by flange 1 if it were stationary on component 7. The pressure $p' \doteq p_o$ is approximately $p_A'$ less lost head between corresponding stations. The range of pressure $p''$ is approximately $p_a - p_e < p'' < p'$ for $0 \leq p_e \leq p_a$ and $0 \leq p'' < p'$ for $p_e > p_a$, where $p_e$ is equivalent outward pressure due to resilience e of component 7 under deformation recovery. Any portion of the pumping component upon release from deformation will expand against $p_a$ for $p'' > p_a - p_e$ when $p_e \leq p_a$ and for all values of $p''$ when $p_e > p_a$.

Since $p_A > p_A'$, a net pressure $p_A - p_A'$ acts on actuator 10 and is maintained thereon due to the progressive deformation of pumping component wall 3 by the passage of flange 1 for a finite interval of time (approximately $L/v$, where $L < d$ is the length of component 7 and d, denoted by numeral 2 in FIG. 1, is the minimum distance between adjacent axles), hydraulic fluid having direction of flow indicated by the numeral 9 in FIG. 1 is supplied to actuator 10 by pumping component 7 causing said actuator to operate under load 14. The head remaining on the outflow side of actuator 10 is sufficient to overcome lost head in the return portion 11 of the hydraulic loop such that $p_A'$ less said lost head is approximately $p_o$.

The deformed portion of pumping component wall 4 caused by the pug of flange 1 thereon recovers its design configuration in somewhat the following manner: (a) since $p' > p''$, expansion of said deformed portion occurs behind said flange as it moves an incremental along component 7, the fluid pressure $p''$ within an incremental volume of said expansion dropping quickly to approximately $p_a - p_e$ for $0 \leq p_e \leq p_a$ or to 0 for $p_e > p_a$; (b) then, since $p' > ''$, fluid flows through conduit 11 into component 7 to fill said volume; (c) then, another said expansion occurs, the fluid pressure $p''$ within an incremental volume of it becoming as in (a) above; (d) then, again, as in (b) above, fluid flows into component 7 to fill said volume; (e) repetition of this cycle of events continues as recovey of said deformation proceeds behind said flange until all portions of the deformed wall 4 freed of said flange's apparent weight $w'$ have recovered their design shape, $p'$ remaining fairly constant as long as the pug of flange 1 is upon component 7; and (f) after said pug leaves component 7 and before the pug of flange 1' arrives thereon, recovery continues in a similar manner until component 7 has essentially recovered its design shape and static pressure $p_o$ or a close approximation thereof prevails throughout the hydraulic loop inclusive of accumulator 12.

The opposing pair or flanges to 1 & 1' on the same two axles corresponding to the other rail of the two-rail track may have an indentical pumping component 7 and the associated conduits 8 & 11 confluent with portion 9 of FIG. 1, thereby doubling the fluid supply to actuator 10 per passing axle.

When $p_A'$ exceeds the pressure $p_o'$ in accumulator 12, fluid enters the accumulator through two-way valve 15, said fluid returning to the loop through the same valve when $p_A' < p_o'$. Similarly, a train's approach from the right utilizes corresponding two-way valve 13. In this way, accumulator 12 serves to protect the integrity of component 7, in particular, and that of the system, in general, from excessive pressures therein. Such pressures would otherwise be common because when the volume of fluid contained within the intersection of flange 1 and component 7 is displaced it has nowhere to go in the loop exclusive of accumulator 12 until flange 1 leaves component 7 assuming the fluid to be incompressible and the loop to be inexpansible. Accumulator 12 also serves to protect the system from surge pressures (often called water hammer) due to the valve-closing effects on conduits 8 & 11 of a flange entering upon the pumping component or leaving therefrom. Also, in this regard, L is made sufficiently less than d to avoid and/or alleviate surge pressures that would otherwise occur due to fluid entrapment between adjacent flanges, 1 & 1', e.g. As further safety measures, a pressure relief valve 16 may be installed directly between component 7 and accumulator 12, said valve being a requirement if on occasion $L \geq d$, , and a hydro-pneumatic reservoir/surge tank may be used instead of or in conjunction with accumulator 12.

Figure 2:
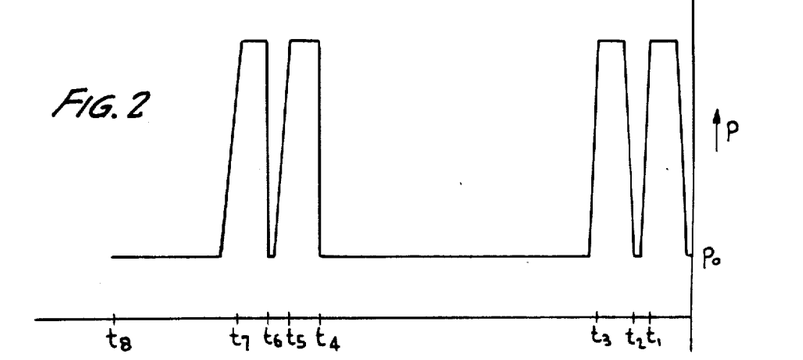
FIG. 2 is a pressure/time graph of the qualitative pressure pulse pattern of two consecutive railroad cars actuating a pumping component.

Basic characteristics of the pug motor's pressure pulse pattern are illustrated in FIG. 2. Assuming that the times $t_i$ are approximate and the speed v is constant and refering to FIG. 3 for definitions of axle separation distances used, the first flange arrives upon the pumping component at time $t_0 = 0$ and stays there until $t_1 = L/v$; then, at $t_2 = d/v$, the second flange arrives and stays until $t_3 = (d+L)/v$; at $t_4 = (d+d')/v$, the third flange arrives and stays until $t_5 = (d+d'+L)/v$; then, at $t_6 = (2d+d')/v$, the fourth flange arrives and stays until $t_7 = (2d+d'+L)/v$; and, at $t_8 = (2d+d'+d'')/v$, the fifth flange arrives completing the cycle of the pressure pulse pattern. Repetition of this 4-pulse cycle of events continues until all of the wheel flanges on the right side of the train have passed over the pumping component, FIGS. 2 & 3

Figure 3:
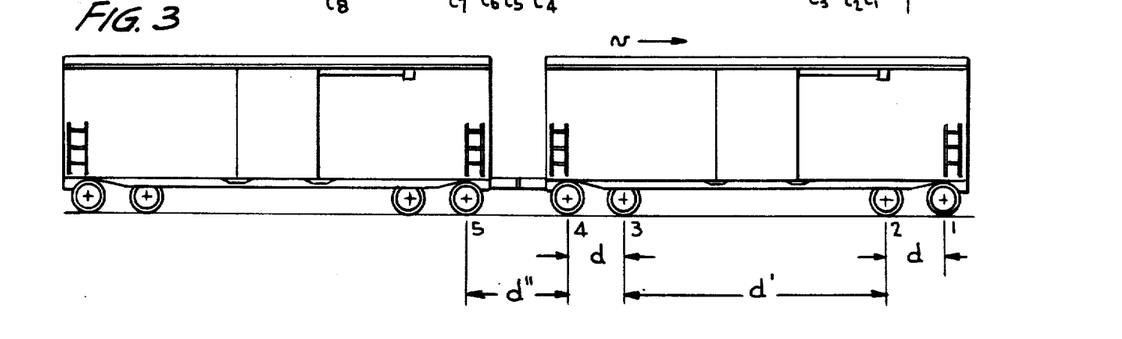
FIG. 3 shows certain railroad car axle separation distances.

Axle separation distances d' & d'' for railroad cars range from about 25'-9" to 40'-5" and 7'-10" to 16'-0.5", respectively, FIG. 3. Corresponding distances for locomotives range from 14' to 29'-4" and 12'-1" to 16'-2" approximately, where, when six axles occur, d' is taken as the distance between the third and fourth. The minimum axle separation distance d is generally 5'-6" and occurs on 50 & 55-ton capacity cars with journals 5"×9" or 5.5"×10", FIG. 3, 70-ton and 100-ton capacity cars having corresponding axle separation distances of 5'-8" to 6' and locomotives 6'-7.5" to 9'. In occasional use are special six-axle trailing units; e.g., there is one grossing approximately 200 tons where the short distances between axles are 5'-9" and 7'-3", the long distance 23'-3.75", and d" = 16'-8.25".

Figure 4:
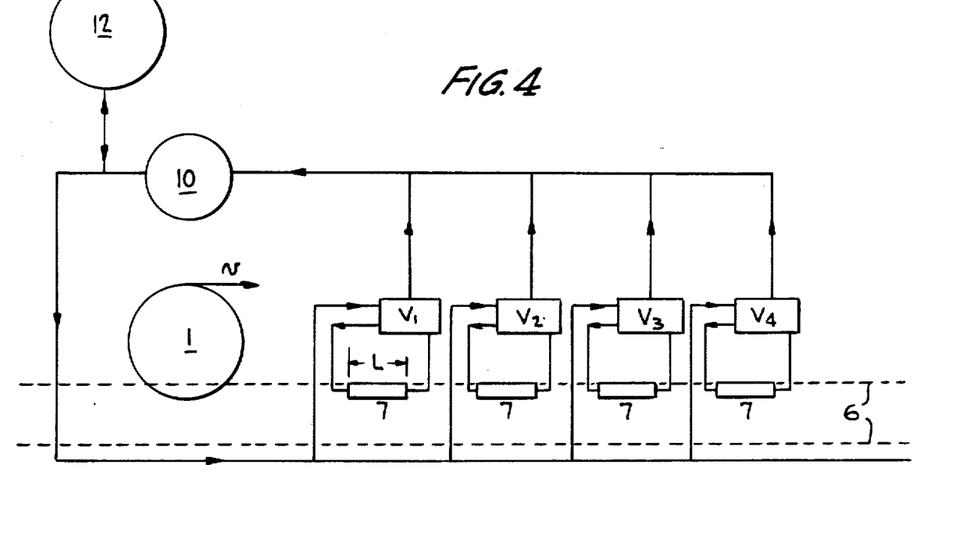
FIG. 4 is a schematic diagram of a pug motor having four pumping components driving a nonreversible actuator.

In the p,t chart of FIG. 2, t-coordinates are representative as to scale but e p-coordinates are not. The time gaps $t_4 - t_3$ and $t_8 - t_7$ shown in FIG. 2 may be suitably filled with pressure pulses, consistent with pumping component recovery time and water hammer considerations, by the compound pug motor illustrated schematically in FIG. 4 where an array of four pumping components are arranged along the same rail and spaced slightly greater than said distance d apart. In most instances, an n-component array where $n \leq 7$ can achieve satisfactory pressure pulse density per cycle. A series of m such arrays can multiply the number of cycles per car by m, but diminishing returns due to increased head losses and costs eventually destroy feasibility of the series concept as m increases. In FIG. 4, each flow control valve arrangement $V_j$, having been actuated by the train's approach, permits fluid from the right end of the ith pumping component to supply the actuator while flange 1 is deforming said component, said valve actuation being maintained until the train has passed the 4-component array. Similarly, a train approaching from the other direction actuates $V_i$ to permit fluid from the left end of the same pumping component to supply the actuator. For nonreversible actuators, valves 13 & 15 and the conduit connecting valve 13 to accumulator 12 are deleted, FIGS. 4, 5, 6 & 9.

Figure 5:
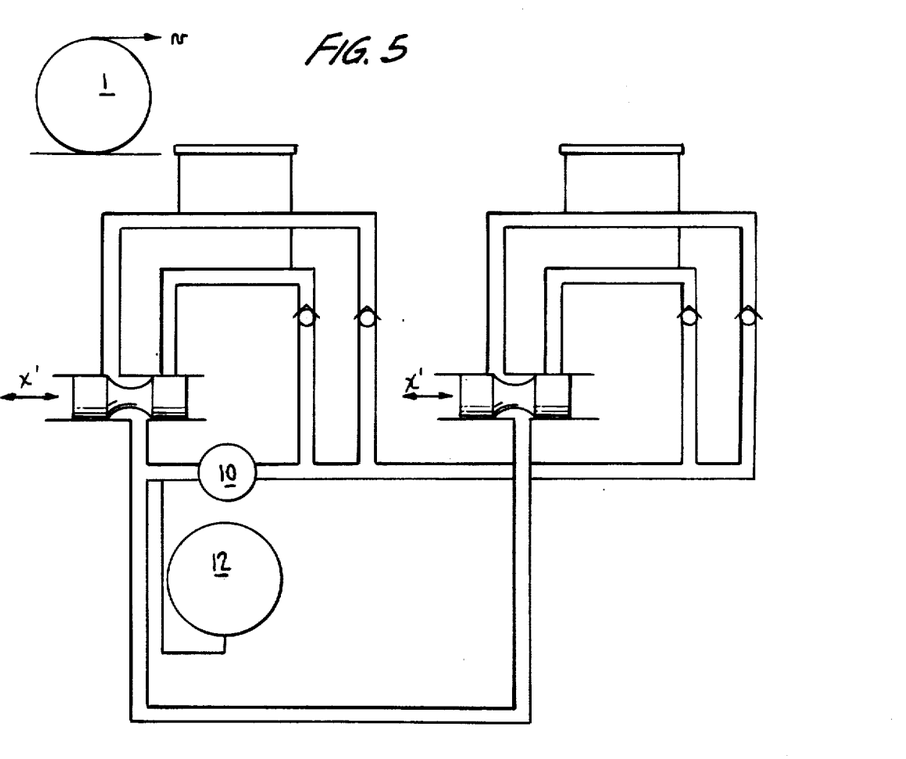
FIG. 5 is a schematic drawing of a spool valve and the corresponding flow control arrangement for a pug motor having two pumping components driving a nonreversible actuator.
Figure 6:
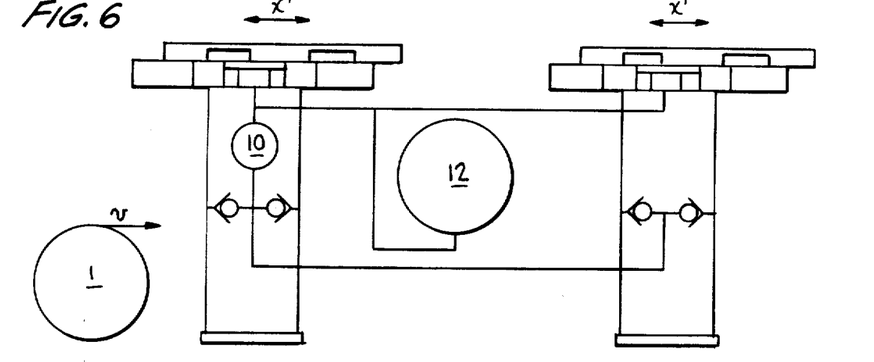
FIG. 6 is a schematic drawing of a plate valve and the corresponding flow control arrangement for a pug motor having two pumping components driving a nonreversible actuator.
Figures 7, 8:
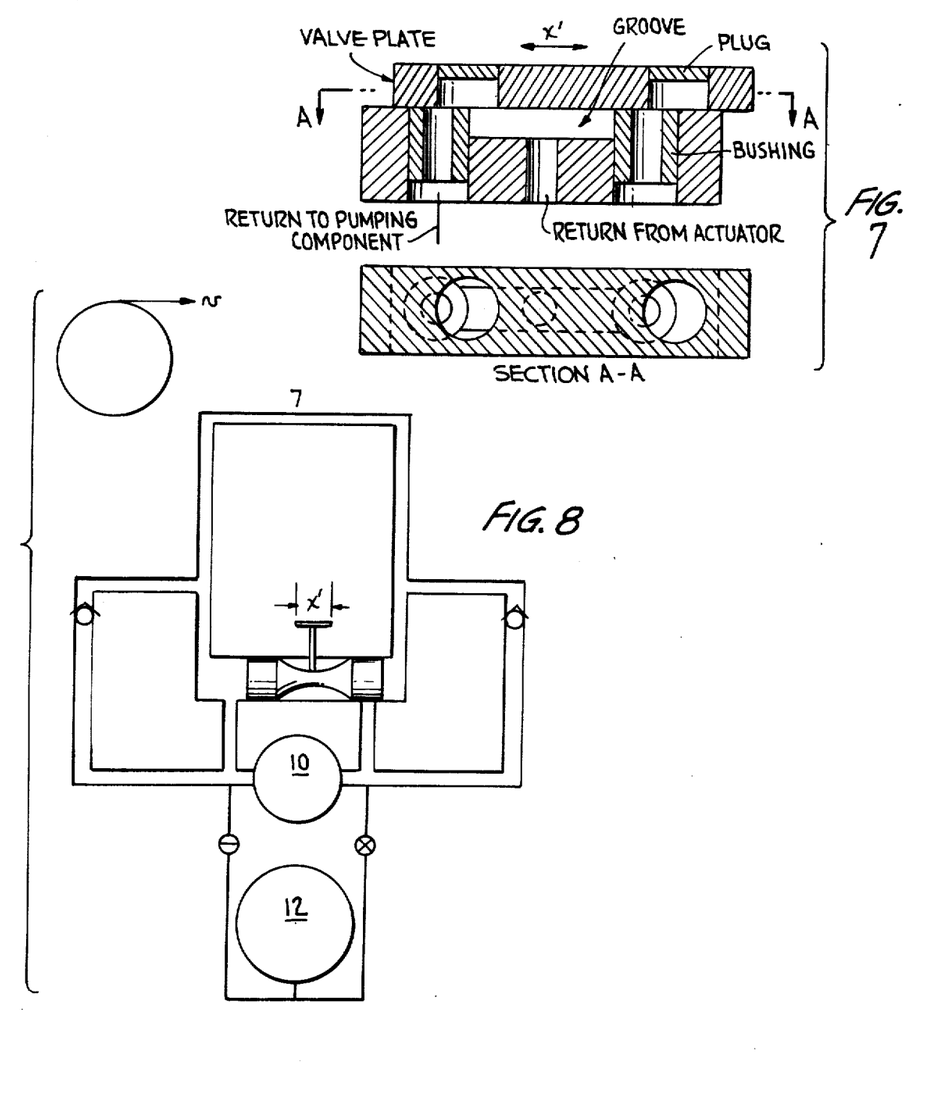
FIG. 7 is a side elevational view, partly in section, of a plate valve.
FIG. 8 is a schematic drawing of a flow control arrangement using a spool valve with a reversible actuator.
Figure 9:
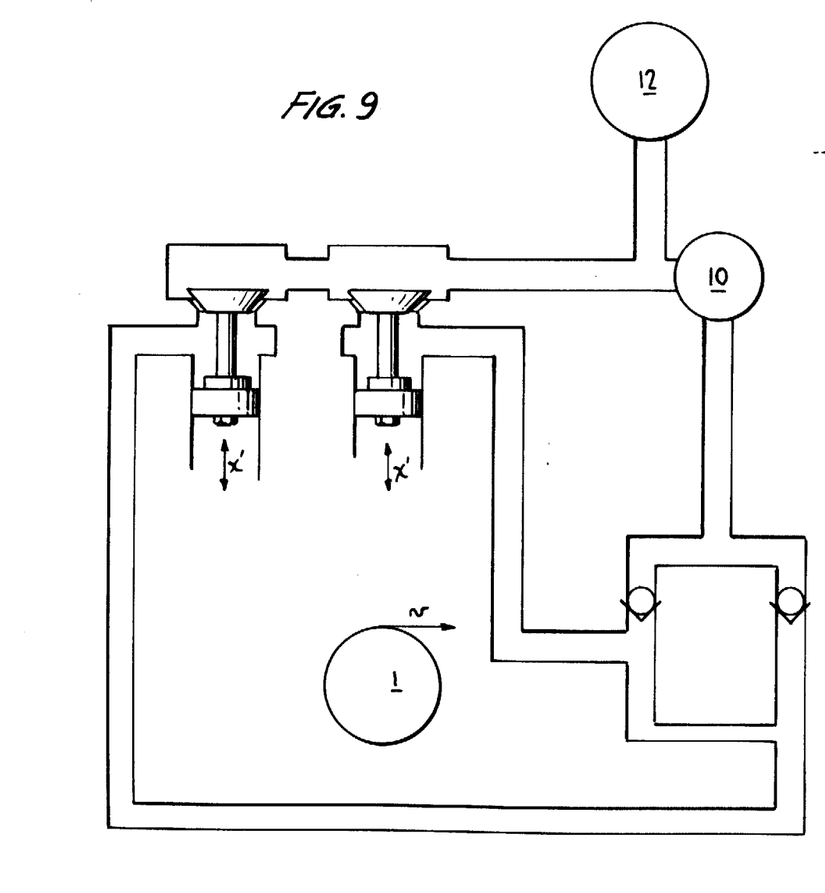
FIG. 9 is a schematic drawing of a flow control arrangement using poppet valves with a nonreversible actuator.

The basic requirements of a suitable $V_i$ are exemplified in the schematic drawings of FIGS. 5 & 6 which show how two pumping components can use said $V_i$ to increase both the volume of fluid supplied to the actuator and its operating time per train; extension to an n-component array is obvious. FIGS. 5 & 6 pertain to nonreversible actuators and are based on the spool valve and plate valve principle, respectively. FIG. 8 pertains to a reversible actuator and uses a spool valve construction, e.g., in the flow control valve arrangement. FIG. 9 schematically illustrates a dual seating valve which may be used in place of the sliding valves shown in FIGS. 5, 6, & 8. The symbol     denotes a nonreturn valve and x' denotes displacement of a valve's movable portion.

The spool valve, which is widely used for continuous control of fluid power as contrasted with on-off applications, must be very precisely made because it depends upon closeness of fit between spool and sleeve to achieve acceptable leakage levels. Prior to the invention of hole-and-plug construction, which is a technique of getting accurate dimensions with ease, the inner surface of the sleeve was comparatively inaccessible making it difficult to finish to high precision and very difficult to measure. This led to the invention of the plate valve.

The plate valve consists of two parts, the movable valve plate and the fixed valve body. If it is made so that only one orifice of the valve opens at the time, the basic requirements of a suitable $F_i$ are met. The drawing in FIG. 7 of a single-sided plate valve is merely schematic. Means must be provided to permit the plate to move only in the desired direction and to maintain the necessary small clearance between plate and body. These constraints have been applied successfully to two general types of construction. In one, reed-type suspensions support the plate against the unbalanced pressure and permit longitudinal motion only. In the other, a symmetrical construction balances out the pressure force, and other constraints assure occurrence of only the desired motion. The hole-and-plug technique used for manufacturing the flat-plate valve of FIG. 7 may also be used for other valve constructions such as suspension, sliding-cylinder, and rotating-cylinder types.

Since they primarily serve to shutoff fluid flow in one direction and re-route it in another, the sliding valve types of FIGS. 5, 6 & 8 may be replaced by a suitable seating type, the conical poppet valve, e.g., FIG. 9. The poppet valve is fairly easy to make and its great advantages are its relative immunity to dirt and the fact that it gives a very tight shutoff. Its disadvantages for precise control are so serieous that it is seldom used for critical continuous control applications. For shutoff applications, however, it is the most generally useful type of valve. Even with the best attainable fit there is always some leakage through a spool or plate valve.

Figures 10, 11, 12:
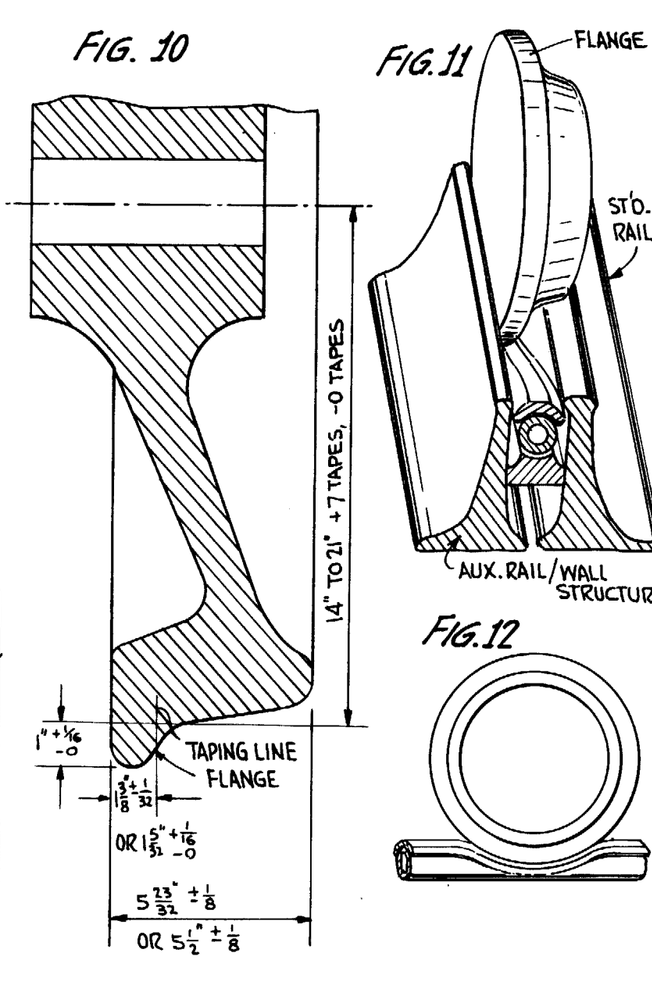
FIG. 10 is a half train wheel view in section.
FIG. 11 is an isometric view, partly in sections, of a pumping component emplaced and being actuated by a wheel flange.
FIG. 12 is a side elevational view of a wheel flange depressing a pumping component.

A segment of standard rail, e.g., or a lighter-weight version thereof of other suitable wall structure having length L or more may be positioned parallel to the inner wall of the actual rail at a separation distance slightly more than the maximum possible lateral motion (less than 4" depending on track curvature and train speed) of the wheel flange in the vicinity of said segment, and a portion of said walls modified for installation of the pumping component between said walls, FIGS. 10, 11 & 12. Then, bridging between said walls may be welded, bolted or otherwise held in place at a suitable height, which may be adjustable, above their base to form the bottom of a channel for supporting and positioning the pumping component, FIG. 11.

An acceptable pumping component for practical use may be circular, arcuate or otherwise in cross section, but it must be capable of sustaining fairly high pressures without expanding appreciably beyond its design volume and, after being sufficiently depressed to achieve the desired pump displacement, it must return essentially to its design volume and be able to repeat this cycle many times. In some situations, it must be capable of all-weather operation. For the best pumping action in some instances, including the traindriven pug motor described here, it must be internally contoured and structured to also act as a seating valve which provides a tight shutoff when a portion of its wall is sufficiently depressed. In most applications, it must have a pumping life that is compatible with the required initial investment and operating costs of the entire pug motor.

The wall of the pumping component may be protected from wear and/or damage due to flange contact therewith by a suitable shield, a band made of steel or other durable material integral with the pumping component itself or with an underliner of suitable material contoured to fit a portion of the pumping component's exterior wall during its deformation, e.g., FIGS. 1, 11 & 12, sandwiched between the flange and the pumping component wall, said shield having length L or more and sufficient resiliency and means for its deformation and recovery in approximate conformance with the pumping component, said shield having width in conjunction with a saddle-like fitting which together serve to make the flange loading fairly uniform over a cross section of the pumping component through accommodation of the required portion of flange weight and lateral motion. Said channel together with said shield compose containment, protective and operational housing for the pumping component, FIG. 11.

Various obstructions below the top surface of the car-axle side of the rail in some places may be avoided as installation sites and the maximum outside vertical dimension of the pumping component assembly taken as the overall height of the rail, approximately 6.5". The controlling factor on the inside vertical dimension of the pumping component is that of the maximum possible vertical depression that the flange can produce, viz., slightly more than 1", which is how far below the top surface of the rail the flange protrudes at most, FIGS. 10 & 11. Subject to this controlling factor, said inside vertical dimension is selected and the pumping component is positioned in said channel with respect to the top surface of the rail to insure good shutoff action by the flange of the fluid leakage to its low pressure side but not so high as to have the pumping component wall damaged by the effective flange weight, the bulk of which should be on the rail, not on the pumping component.

For railroad cars and locomotives, the effective weight W of the flange, taken as the car or locomotive weight divided by the number of wheels, generally lies in the net (light) weight range 6,400 to 33,000 pounds or 30,000 to 35,000 pounds, respectively. Consequently, w, the reaction (an apparent lifting force) to that portion of W supported by fluid pressure can be several thousand pounds consistent with the safety requirements of the pug motor and the train. The magnitude of w is easily controlled by selecting the lost head across the loaded actuator so that the corresponding pressure P at the flange is set at a level safe for the operation of the hydraulic loop and the passage of the train. When P is set, the lifting force w is automatically set at a corresponding level and various band. For example, letting the effective radius of the flange be 20" and assuming that the return pressure is $P'=p''-p_a+p_c$ at the flange, the supply pressure is $P=p_w-p_a+p_c$ at the flange, and the reaction force w" required to stop the leakage under the flange is 10% of w, where $p_c=0$, $p''=p_a=14.7$ psi, $p_w=p_{wo}+p_v$, $p_v=\rho(vA/CA_o)^2/2$, $p_{wo}=114.7$ psi, $v=60$ mph, $A=\pi a^2$ in$^2$, $CA_o=1$ in$^2$, and $\rho=55$ lbs/ft$^3$, Eqs. (4), (6) & (31) are used to calculate approximately that portion w' ($=$w"$+$w) of W supported by the base of the pumping component housing for a hose-type pumping component of radius a and the results are given in TABLE 1 for selected values of a. Ideally, for a flange height of 1", corresponding to $a=0.5$" in this example, the pump power P generated while the train is passing is approximately 16 hp by Eq. (3). Similarly, for a flange height of 2", $a=1$", $CA_o=6.74$ in$^2$, and $w'=1586$ lbs., the corresponding pump power is 55 hp. As a second example, if $v=15$ mph instead of 60 mph, the corresponding set of numbers to those in the last four columns of TABLE 1 are given in TABLE 2 and the pump powers corresponding to those calculated for the first example above are 3 hp and 13 hp, respectively.

Utility

Let a measure of the pug motor's utility U at a given location be the fraction or percent of the time that it would operate if placed there. Then, its utility may be expressed by the equation $$U = \frac{\text{operating time}}{\text{operating time} + \text{nonoperating time}} \quad (1)$$

$$\doteq \sum_{i=1}^{N} \frac{L_i + nL + (n-1)d}{86{,}400\, v_i},$$

where $v_i >> (L_i+nL+nd-d)/86{,}400;$ n = number of pumping components in array;

N = number of trains passing array per day;

L = length of pumping component, ft.;

d = distance between adjacent pumping components in array, ft.;

$v_i$ = speed (assumed constant) of ith train while passing array, ft/sec; and $L_i$ = length of ith train, ft.

The utility may be improved at a given location by increasing the number of pumping components in the pug motor; e.g., when m arrays of components are used in series, with n components in each array, the utility is given by Eq. (1) with n replaced by the product mn.

For a multiple track pug motor installation with all of the pumping components supplying a single actuator, $$U = \sum_{j=1}^{M} U_j \quad (2)$$

where M is the number of pairs of rails and $U_j$ is the utility of the pumping component array or arrays installed on the jth pair of rails.

Power

Figure 13:
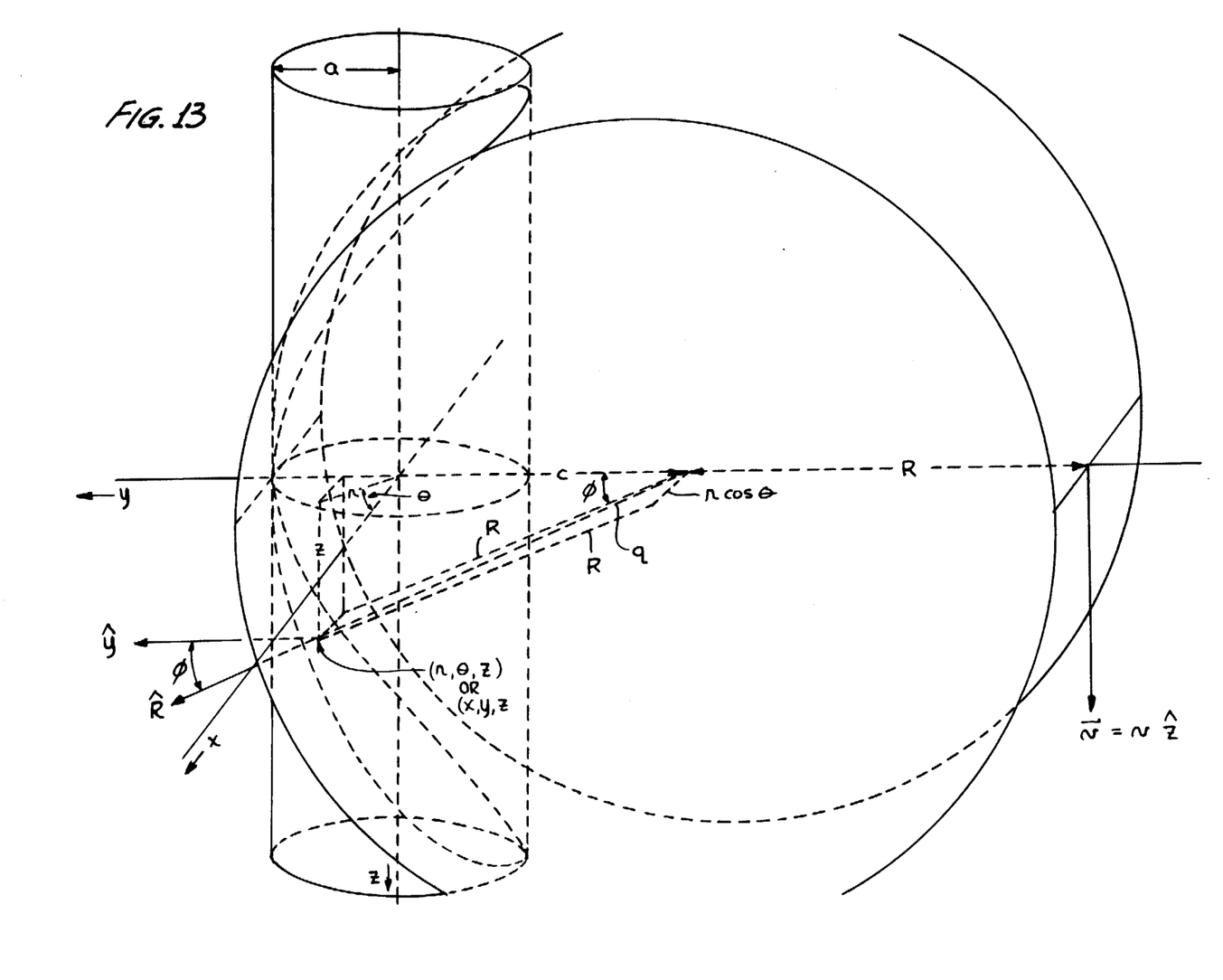
FIG. 13 depicts the geometry of two intersecting cylinders representing the actuation of a pumping component by a train wheel flange and used in a mathematical model for calculating approximately the relationship between the apparent lifting force on the flange and the magnitude of the corresponding pressure pulse.

Since power is rate of doing work, it is seen with reference to FIG. 13 that ideal pump power of the pug motor is approximately given by $$\bar{P} = \bar{F} \cdot (d\bar{z}/dt) = (F\,\hat{R}) \cdot (\hat{z}\,dz/dt) = F\,\hat{R} \cdot \hat{z}\, v = F_z v \doteq \int \quad (3)$$

$$\int_S (p_w - p_a + p_c)\,\hat{R} \cdot \hat{z}\, v\, dS \doteq (p_w - p_a + p_c) A v$$

where $\bar{v}=v\hat{z}$ is the velocity of the train while passing the pumping component; z is a unit vector along the z-axis; $\hat{R}$, taken as positive when drawn outward from S, is a unit vector along the radius of the cylinder representing the flange; $\hat{R}\cdot\hat{z}$ is the cosine of the angle between $\hat{R}$ & $\hat{z}$; $F_z=F\hat{R}\cdot\hat{z}$, the force on the fluid in the z-direction due to flange motion, is approximately the force required to slide a wheel flange along a pumping component at uniform speed v neglecting the resistance due to friction; S, assumed to have shape as the intersecting surface of the flange cylinder, is the interior area of the pumping component wall in contact with fluid beneath the flange on the high pressure side; $p_w-p_a+p_c$ is net fluid pressure acting on area S; and A is the interior cross sectional design area of the pumping component.

Pressure

The pressure pulse developed by the pumping component derives primarily from the weight and speed of the train.

With reference to FIG. 13, letting the flange/shield be represented by a suitable cylinder, considering a pumping component having circular cylinder geometry, and using cylindrical coordinates $(r,\theta,z)$ in conjunction with rectangular Gartesian coordinates (x,y,z) as needed, an approximation of the pressure pulse suitable for preliminary analysis can be derived and expressed as a simple function of $p_{wo}$ (the pressure due to w when the train's speed is zero), the pressure $p_v$ due to the train's speed v, the effective flange radius R, the pumping component inside radius a, and that portion w of the effective flange weight W that is supported by the fluid in the pumping component, the principal symbols used being defined as follows:

S = area of flange/shield cylinder lying within pumping component cylinder for $z \geq 0$;

S' = area of flange/shield cylinder lying within pumping component cylinder for $z \leq 0$;

q = line segment connecting center of flange/shield cylinder with arbitrary point $(r,\theta,z)$ or (x,y,z) on S or S';

a = inside radius of pumping component;

R = effective flange radius = projection of q on yz-plane = radius of flange + pumping component wall thickness or radius of curvature of shield portion under flange + pumping component wall thickness where $2a<R<a+L^2/16a$;

$c=R-a;$ r=a, equation of pumping component inside wall, the cylinder having height $L > 4\sqrt{ac}$;

$r = (\sqrt{R^2-z^2} - c) \csc \theta$, equation of flange/shield, the cylinder having height $> 2a$;

$z^2 = R^2 - (c + a \sin \theta)^2$, equation of intersection of flange/shield and pumping component cylinders;

W = effective weight of flange≐car weight divided by the number of wheels per car;

w = reaction force to portion of W supported by fluid pressure, set by design sufficiently less than W to restrict loop pressures and corresponding lifting forces on the car to safe values;

w″ = reaction force to portion of W needed to prevent fluid flow under the flange to its low pressure side;

w′ = w + w″ ≐ reaction force to portion of W supported by base of pumping component housing;

$\hat{y}$ = unit vector along y-axis;

$\hat{R}$ = unit vector along R, positive when drawn outward from S or S′;

$\hat{R} \cdot \hat{y} = \cos \phi$ where $\phi$ is angle between $\hat{R}$ & $\hat{y}$;

$\rho$ = density of fluid;

v = speed of train;

$p_v$ = pressure due to v;

$p_w = p_{wo} + p_v \doteq$ pressure due to w;

$p_{wo}$ = pressure due to w when $v = 0_1 (p_{wo} \geq p_{Ao})$;

$p_{Ao}$ = minimum operating pressure of actuator under load;

$p_A$ = operating pressure of actuator under load, $(p_{Ao} \leq p_A \leq p_w)$;

$p_a$ = atmospheric pressure;

A = cross sectional area of pumping component;

$A_o$ = cross sectional area of pumping component orifice; and

C = coefficient of fluid discharge of pumping component orifice.

Assuming that v is constant while a train is passing a pumping component array and there is no leakage by the flange, the speed contribution to the pressure is approximately given by $$p_v = (vA/CA_o)^2 \rho/2 \tag{4}$$

where, if the product $CA_o$ is made sufficiently greater than unity, the pressure $p_v$ is negligible with respect to $p_w$.

Resolving the differential fluid forces on the flange into vertical and horizontal components, the integral of the vertical forces may be interpreted as being equal approximately to w, a safe fraction of W, and the integral of the products of the horizontal forces and their respective normal distances to the lowest point of the flange as a decelerating torque on the wheel. Ignoring the latter, in particular, and the train's momentum reduction, in general, since momentum reduction presents no problem in practice, being easily made into an asset, simplifies the problem of finding the relationship between w and $p_w$ without much loss in the utility of its solution.

By definition, pressure is the normal force per unit area. Hence, in general, the corresponding force is given by the product of the pressure and the area perpendicular to the direction of the force. Since fluid pressure p* on a container wall is directed along the normal n to the differential area dS of the wall surface in the neighborhood of n, the corresponding force f in the direction $\hat{u}$ may be written $$f = \int_S \int p^* n \cdot u \, dS$$

which reduces to $$f = \int_S \int p^* \, dS$$

if $n = \hat{u}$, where the symbol denotes a unit vector, n and $\hat{u}$ are taken as positive when drawn outward from S, and S denotes the interior surface area of the container wall over which p* is distributed.

Assume that the portion of the inner wall of the pumping component that is deformed under the flange/shield lies smoothly within the surface areas S and S′, that the pressure is normal to each differential area dS or dS′, and that the resultant of the vertical forces due to net (gauge) pressures acting over S and S′ is w, the apparent decrease in effective weight W, and let net pressures on the large cylinder (flange/shield) in the regions of integration be denoted by $P = p - p_a + p_e = p_w - p_a + p_e$ and $P' = p'' - p_a + p_e$ on the +z and −z sides of the origin, respectively, FIG. 15. Then, $$w = \int_S \int P(-\hat{R}) \cdot (-\hat{y}) dS + \int_{S'} \int P'(-\hat{R}) \cdot (-\hat{y}) dS' \tag{5}$$

$$= \int_A \int P\hat{R} \cdot \hat{y} f(x,y) dA + \int_{A'} \int P'\hat{R} \cdot \hat{y} f(x,y) dA'$$

where $$f(x,y) = \sqrt{1 + (\partial z/\partial x)^2 + (\partial z/\partial y)^2} \; ; z = \pm \sqrt{R^2 - (c+y)^2} \, ,$$

the + & − sign on the radical pertaining to integration over S & S′, respectively; and A & A′ denote the area of the circle $x^2 + y^2 = a^2$ onto which the surface areas S & S′, respectively, project.

Assuming the pressures P & P′ are constant over their respective surfaces of integration, Eq. (5) becomes $$P + P' \doteq w/I(a,R) \tag{6}$$

where $$I(a,R) = \int_{-a}^{+a} \int_{-\sqrt{a^2-y^2}}^{+\sqrt{a^2-y^2}} \frac{R \cos \phi}{\sqrt{R^2 - (c+y)^2}} \, dx \, dy \tag{7}$$

and it can be seen from the drawing in FIG. 13 that $$\cos \phi = (y+c)/R. \tag{8}$$

Substituting the right side of Eq. (8) for $\cos \phi$ in Eq. (7) and integrating with respect to x yields $$I(a,R) = 2 \int_{-a}^{+a} (c+y) \sqrt{\frac{a^2 - y^2}{R^2 - (c+y)^2}} \, dy$$

which, letting $\nu = \arcsin (c+y)/R$, becomes $$I(a,R) = 2R \int_{v_1}^{\pi/2} \sqrt{a^2 - (R\sin v - c)^2} \sin v \, dv \quad (9)$$

where $$v_1 = \arcsin(1 - 2a/R). \quad (10)$$

Letting $u = \tan v/2$, Eq. (9) becomes $$I(a,R) = 8R \int_{u_1}^{1} \frac{Qu}{(1+u^2)^3} \, du \quad (11)$$

where $$u_1 = (R - 2\sqrt{ac})/(R - 2a) \quad (12)$$

and $$Q^2 = a^2(1+u^2)^2 - [2Ru - c(1+u^2)]^2 \quad (13)$$
$$= R(R - 2a)(1-u)^2[-1 - u^2 + 2Ru/(R - 2a)].$$

Letting $T = (u+1)/(1-u)$, Eq. (11) becomes $$I(a,R) = 8R\sqrt{R} \int_{\sqrt{c/a}}^{\infty} [(1+T^2)^{-2} - 2(1+T^2)^{-3}] \sqrt{aT^2 - c} \, dT. \quad (14)$$

Letting $T = \sqrt{c/a} \sec\xi$, Eq. (14) becomes $$I(a,R) = 8R\sqrt{R}(I_1 - 2I_2) \quad (15)$$

$$I_1 = \sqrt{a} /2 \int_{\xi=0}^{\pi/2} \frac{\sin\xi \, d(ca^{-1}\sec^2\xi)}{(1 + ca^{-1}\sec^2\xi)^2} \quad (16)$$

and $$I_2 = \sqrt{a} /2 \int_{\xi=0}^{\pi/2} \frac{\sin\xi \, d(ca^{-1}\sec^2\xi)}{(1 + ca^{-1}\sec^2\xi)^3} \quad (17)$$

In Eqs. (16) & (17), letting $\mu = \sin\xi$ and $d\lambda =$ the rest of the integrand, integration by parts yields $$-\sqrt{a} \, 2^{-1} \sin\xi/(1 + ca^{-1}\sec^2\xi) +$$
$$\sqrt{a} /2 \int \cos\xi \, d\xi/(1 + ca^{-1}\sec^2\xi)$$

and $$-\sqrt{a} \, 4^{-1} \sin\xi/(1 + ca^{-1}\sec^2\xi) +$$
$$\sqrt{a} /4 \int \cos\xi \, d\xi/(1 + ca^{-1}\sec^2\xi),$$

respectively. Then, substitution of these two expressions for $I_1$ & $I_2$ in Eq. (15) yields $$I(a,R) = \frac{-4Rc\sqrt{R} \sin\xi \cos^2\xi}{\sqrt{a}(\cos^2\xi + c/a)^2} \Bigg|_{\xi=0}^{\pi/2} + \quad (18)$$

-continued $$\frac{4Rc\sqrt{R}}{\sqrt{a}} \int_0^{\pi/2} \frac{\sec\xi \, d\xi}{(1 + ca^{-1}\sec^2\xi)^2}.$$

Noting that the first term on the right side of Eq. (18) is zero and letting $\alpha = \tan \xi/2$ in the second term, it can be shown that $$I(a,R) = \frac{8ac\sqrt{a}}{\sqrt{R}} \int_0^1 \frac{f(\alpha)}{g(\alpha)} \, d\alpha \quad (19)$$

where $$f(\alpha) = (1 - \alpha^2)^3 \quad (20)$$

and $$g(\alpha) = [\alpha^4 + 2(1 - 2a/R)\alpha^2 + 1]^2 \quad (21)$$
$$= (\alpha - \beta_1)^2(\alpha - \bar{\beta}_1)^2(\alpha - \beta_2)^2(\alpha - \bar{\beta}_2)^2$$
$$= [\alpha^2 - (\beta_1 + \bar{\beta}_1)\alpha + \beta_1\bar{\beta}_1]^2[\alpha^2 - (\beta_2 + \bar{\beta}_2)\alpha + \beta_2\bar{\beta}_2]^2$$
$$= (\alpha^2 + 1 + 2\alpha\sqrt{a/R})^2(\alpha^2 + 1 - 2\alpha\sqrt{a/R})^2,$$

since $\beta_i$, $\bar{\beta}_i$, the roots of the quartic equation $\alpha^4 + 2(1 - 2a/R)\alpha^2 + 1$, can be shown to be:

$$\beta_1 = -(a/R)^{\frac{1}{2}} + i(1 - a/R)^{\frac{1}{2}}, \quad (22)$$

$$\bar{\beta}_1 = -(a/R)^{\frac{1}{2}} - i(1 - a/R)^{\frac{1}{2}}, \quad (23)$$

$$\beta_2 = (a/R)^{\frac{1}{2}} + i(1 - a/R)^{\frac{1}{2}}, \quad (24)$$

and $$\bar{\beta}_2 = (a/R)^{\frac{1}{2}} - i(1 - a/R)^{\frac{1}{2}}. \quad (25)$$

Decomposing $f(\alpha)/g(\alpha)$ in the integrand of Eq. (19) into a sum of partial fractions, it may be written $$\frac{f(\alpha)}{g(\alpha)} = \frac{B_{11} + C_{11}\alpha}{1 + \alpha^2 + 2\alpha\sqrt{a/R}} + \frac{B_{12} + C_{12}\alpha}{(1 + \alpha^2 + 2\alpha\sqrt{a/R})^2} + \frac{B_{21} + C_{21}\alpha}{1 + \alpha^2 - 2\alpha\sqrt{a/R}} + \frac{B_{22} + C_{22}\alpha}{(1 + \alpha^2 - 2\alpha\sqrt{a/R})^2}. \quad (26)$$

Multiplying Eq. (26) through by $g(\alpha)$ as given in Eq. (21), expanding $f(\alpha)$ as given in Eq. (20) in powers of $\alpha$, collecting like terms in powers of $\alpha$ on each side of the equation, equating like coefficients of powers of $\alpha$, and solving the resulting eight equations simultaneously, the desired parameters, $B_{ij}$ & $C_{ij}$, can be shown to be:

$$B_{11} = B_{12} = R/2a, \quad (27)$$

$$B_{12} = B_{22} = (a - R)/2a, \quad (28)$$

$$C_{11} = -C_{21} = (aR)^{\frac{1}{2}}(R+a)/4a^2, \quad (29)$$

and $$C_{12} = -C_{22} = (aR)^{-\frac{1}{2}}(a - R)/2. \quad (30)$$

Upon using the right sides of Eqs. (27) through (30) to replace corresponding parameters in Eq. (26), then substituting the resulting expression for $f(\alpha)/g(\alpha)$ in Eq. (19) and integrating the resulting equation, it can be shown after careful algebraic simplification that $$I(a,R) = -2(R - a)(aR)^{\frac{1}{2}} + (R^2 - a^2) \log_e^{-1} \frac{\sqrt{R} + \sqrt{a}}{\sqrt{R} - \sqrt{a}}. \quad (31)$$

The pug motor is not limited to the embodiments shown and discussed above, but can be varied within the scope of the claims presented here.

What is claimed and desired to be secured by United States Letters Patent is:

1. A positive displacement pump comprising:
   a reservoir of fluid, said fluid to be pumped to another location R', compatible with the pressure p that can be developed at the pump where it is to be discharged from the loop against pressure p'';
   a conduit C' filled with said fluid and leading from said reservoir through a nonreturn valve $V_R$, located within the fluid of said reservoir, to a nonreturn valve $V_k$ which opens into $E_k$, an adjunct of C', comprising a container with a collapsible wall having length less than the minimum distance between train wheel axles, width less than the distance between train rails, interior vertical dimension comparable to train wheel flange height, overall vertical dimension less than train rail height, and resilience e, and being externally exposed to static pressure $p'_a$;
   said $E_k$ filled with said fluid at a static absolute pressure $p_o$, where $p_a' - p_e < p_o \geq p''$ for $0 \leq p_e \leq p'_a$ and $0 \leq p_o \leq p''$ for $p_e > p'_a$, $p_e$ denoting the outward pressure equivalent of said resilience e;
   said $E_k$ emplaced between the two rails of the train track separate from either rail;
   said $E_k$ having suitable means for eliminating vapor if said fluid is a liquid;
   said $V_R$ having means and position with respect to said $V_k$ compatible with fluid supply thereto at said pressure $p_o$;
   at least a portion of the exterior wall of said $E_k$ being engageable by any given wheel flange of a passing train for a finite interval of time thereby causing, via its impulse delivery, a loss of volume in $E_k$, the corresponding loss of fluid from $E_k$ comprising pump displacement;
   said flange causing an applied force $\vec{F} = -\hat{u}F$ at least a portion of which deforms a portion of $E_k$ having surface area S in contact with said fluid in $E_k$ thereby causing dynamic absolute pressure $p = np$ to develop in $E_k$ such that the fluid-contributed portion f of the reaction to said applied force is approximately given by $$f = \int_S \int (p - p'_a + p_e) \hat{n} \cdot \hat{u} \, dS$$

where f is at least a portion of F, the reaction to the difference between f and F being balanced by means other than fluid pressure, $\hat{u}$ and $\hat{n}$ are unit vectors along the line of action of $\vec{F}$ and along the normal to S, respectively, being taken as positive when drawn outward from S, and p, S, $\hat{u}$ and n may be functions of position and time;
   said $E_k$ and said impulse being sufficient size, and said $E_k$ and said means of impulse delivery being geometry, engagement means, and safety features such that during said impulse said pressure p in $E_k$ while not becoming too large becomes large enough to cause sustained flow of a quantity of fluid out of $E_k$ through a non-return valve $V'_k$ into and through a conduit C'' to said station R' at which said pressure p developed at the impulse-producing station of $E_k$ has been reduced by lost head between stations to p' which is greater than said p''; and
   motion of the train removing said flange so that said loss of volume in $E_k$ can be recovered resiliently and by net outward fluid pressure on the inner wall surface of $E_k$, said quantity of fluid flowing out of $E_k$ through nonreturn valve $V'_k$ being replaced by an equal amount flowing in through said nonreturn valves $V_R$ and $V_k$, and the cycle of deformation and recovery of $E_k$ continued in an arbitrary time sequence of discrete impulses where the time interval between successive impulses is greater than the recovery time of $E_k$.

2. A device as recited in claim 1, wherein the quantity of fluid flow at said station R' due to impulses initiated at said $E_k$ and the corresponding pressure pulse pattern developed at station R' are sufficient to operate a fluid actuator placed there, the head lost across the actuator being said p' less $p'_o$ where $p'_o$ is greater than said p''.

3. In a device as recited in claim 1, said safety features including a pressure relief valve installed in said $E_k$ between said deformation station and said valve $V_k$.

4. A positive displacement pump comprising:
   a fluid-filled container $E_k$ comprising a collapsible wall having length less than the minimum distance between train wheel axles, width less than the distance between train rails, interior vertical dimension comparable to train wheel flange height, overall vertical dimension less than train rail height, and resilience e, and being exposed externally to static presure $p'_a$ and internally to static absolute pressure $p_o$, deformation of which compels at least a portion of said fluid to leave $E_k$ via a nonreturn valve $V'_k$, thereby producing flow in a conduit C'' and throughout a fluid-filled loop, said flow passing through a fluid actuator, emerging thereform at pressure $p'_o$ compatible with the pressure p that can be developed at $E_k$, before returning through a conduit C' and entering $E_k$ at a nonreturn valve $V_k$, where $p'_a - p_e < p_o < p'_o$ for $0 \leq p_e \leq p'_a$ and $0 \leq p_o < p'_o$ for $p_e > p'_a$, $p_e$ denoting the outward pressure equivalent of said resilience e;
   said $E_k$ emplaced between the two rails of the train track separate from either rail;
   said $E_k$ having means for eliminating vapor if said fluid is a liquid;
   at least a portion of the exterior wall of said $E_k$ being engageable by any given wheel flange of a passing train for a finite interval of time thereby causing via its impulse delivery a loss of volume in $E_k$, the corresponding loss of fluid from $E_k$ comprising pump displacement;
   said flange causing an applied force $\vec{F} = -\hat{u} F$ at least a portion of which deforms a portion of $E_k$ having surface area S in contact with said fluid in $E_k$ thereby causing dynamic absolute pressure $= n\,p$ to develop in $E_k$ such that the fluid-contributed portion f of the reaction to said applied force is approximately given by $$f = \int_S \int (p - p'_a + p_e) \hat{n} \cdot \hat{u} \, dS$$

where f is at least a portion of F, the reaction to the difference between f and F being balanced by means other than fluid pressure, û and n̂ are unit vectors along the line of action of F̄ and along the normal to S, respectively, being taken as positive when drawn outward from S, and p, S, û and n̂ may be functions of position and time;

said $E_k$ and said impulse having sufficient size, and said $E_k$ and said means of impulse delivery having geometry, engagement means, and safety features such that during said impulse said pressure p in $E_k$ while not becoming too large becomes large enough to cause sustained flow of fluid out of $E_k$ through said valve $V'_k$ into and through said conduit C'' to the input side of said actuator at which said pressure p developed at the impulse-producing station of $E_k$ has been reduced by lost head between stations to p' which is greater than said $p'_o$ and the quantity of fluid flow due to impulses initiated at $E_k$ and the corresponding pressure pulse pattern developed are sufficient to operate said actuator, from which said flow emerges into said conduit C' where, installed on a tee-connection therefrom, a suitable fluid accumulator having static pressure $p_o$ serves as a fluid reservoir and also to accumulate and release fluid during $E_k$'s deformation and recovery, respectively, as required, returning same to said $E_k$ via said valve $V_k$, the head lost across said actuator being said p' less $p'_o$ where $p'_o$ is greater than said $p_o$ and $p'_o$ less said $p_o$ is the head lost between the outflow side of the actuator and the fluid return station at said valve $V_k$; and motion of the train removing said flange so that said loss of volume in $E_k$ can be recovered resiliently and by net outward fluid pressure on the inner wall surface of $E_k$, said quantity of fluid flowing out of $E_k$ through said valve $V'_k$ being replaced by an equal amount flowing in through said valve $V_k$, and the cycle of deformation and recovery of $E_k$ continued in an arbitrary time sequence of discrete impulses where the time interval between successive impulses is greater than the recovery time of $E_k$.

5. In a device as recited in claim 4, said safety features including a pressure relief valve installed in said $E_k$ between said deformation station and said valve $V_k$.

6. A positive displacement pump comprising:

a reservoir of fluid, said fluid to be pumped to another location R', compatible with the pressure p that can be developed at the pump, where it is to be discharged from the loop against pressure p'';

a conduit C' filled with said fluid and leading from said reservoir through a nonreturn valve $V_R$, located within the fluid of said reservoir, to $E_k$, an adjunct of C', comprising a container with a collapsible wall having length less than the minimum distance between train wheel axles, width less than the distance between train rails, interior vertical dimension comparable to train wheel flange height, overall vertical dimension less than train rail height, and resilience e, and being externally exposed to static pressure $p'_a$;

said $E_k$ emplaced between the two rails of the train track separate from either rail;

said $E_k$ filled with said fluid at static absolute pressure $p_o$, where $p'_a - p_e < p_o \leq p''$ for $0 \leq p_e \leq p'_a$ and $0 \leq p_o \leq p''$ for $p_e > p'_a$, $p_e$ denoting the outward pressure equivalent of said resilience e;

said $E_k$ having suitable means for eliminating vapor if said fluid is a liquid;

said $V_R$ having means and position with respect to the supply side of said $E_k$ compatible with fluid supply thereto at said pressure $p_o$;

at least a portion of the exterior wall of said $E_k$ being engageable by any given wheel flange of a passing train for a finite interval of time thereby causing via its impulse delivery a loss of volume in $E_k$, the corresponding loss of fluid from $E_k$ comprising pump displacement;

said flange causing an applied force $\bar{F} = -\hat{u} F$ at least a portion of which deforms a portion of said $E_k$ having surface area S in contact with said fluid in $E_k$ thereby causing dynamic absolute pressure $\bar{p} = \hat{n}p$ to develop in $E_k$; said flange engaging said $E_k$ in a manner compelling fluid flow out of $E_k$ in the desired direction in the loop, said flange depressing $E_k$ such that when its wall is fully depressed said applied force is sufficient to develop the fluid-contributed portion f of the reaction to said applied force and to limit to a tolerable level fluid leakage past the flange to its low pressure side, and said fluid reaction f is given approximately by $$\int_{S'} \int (p - p'_a + p_e) \hat{n} \cdot \hat{u} \, dS' + \int_{S''} \int (p_o - p'_a + p_e) \hat{n} \cdot \hat{u} \, dS''$$

where S' and S'' denote that portion of said surface area S lying on the high and low pressure side, respectively, of said fully depressed wall, f is at least a portion of said F, the reaction to the difference between f and F being balanced by means other than fluid pressure, û and n̂ are unit vectors along the line of action of said F̄ and along the normal to S, respectively, being taken as positive when drawn outward from S, and p, S, û and n̂ may be functions of position and time;

said $E_k$ and said impulse having sufficient size, and said $E_k$ and said means of impulse delivery having geometry, engagement means, and safety features such that during said impulse said pressure p in $E_k$ while not becoming too large becomes large enough to cause sustained flow of fluid out of $E_k$ into and through a conduit C'' to said station R' at which said pressure p developed at the impulse-producing station of $E_k$ has been reduced by lost head between stations to p' which is greater than said p''; and motion of the train removing said flange so that said loss of volume in $E_k$ can be recovered resiliently and by net outward fluid pressure on the inner wall surface of $E_k$, said quantity of fluid flowing out of $E_k$ being replaced by an equal amount flowing in through said nonreturn valve $V_R$, and the cycle of deformation and recovery of $E_k$ continued in an arbitrary time sequence of discrete impulses where the time interval between successive impulses is greater than the recovery time of $E_k$.

7. A positive displacement pump comprising:

a fluid-filled container $E_k$ comprising a collapsible wall having length less than the minimum distance between train wheel axles, width less than the distance between train rails, interior vertical dimension comparable to train wheel flange height, overall vertical dimension less than train rail height, and resilience e, and being exposed externally to static pressure $p'_a$ and internally to static absolute pressure $p_o$, deformation of which compels at least a portion of said fluid to leave $E_k$ and enter a conduit $C''$, thereby producing flow in said $C''$ and throughout a fluid-filled loop, said flow passing through a fluid actuator, emerging therefrom at pressure $p'_o$ compatible with the pressure p that can be developed at $E_k$, before returning through a conduit $C'$ and entering $E_k$, where $p'_a - p_e < p_o < p'_o$ for $0 \leq p_e \leq p'_a$ and $0 \leq p_o < p'_o$ for $p_e > p'_a$, $p_e$ denoting the outward pressure equivalent of said resilience e;

said $E_k$ emplaced between the two rails of the train track separate from either rail;

said $E_k$ having means for eliminating vapor if said fluid is a liquid;

at least a portion of the exterior wall of said $E_k$ being engageable by any given wheel flange of a passing train for a finite interval of time thereby causing by virtue of its impulse delivery a loss of volume in $E_k$, the corresponding loss of fluid from $E_k$ comprising pump displacement;

said flange causing an applied force $\vec{F} = -\hat{u}F$ at least a portion of which deforms a portion of said $E_k$ having surface area S in contact with said fluid in $E_k$ thereby causing dynamic absolute pressure $\bar{p} = \hat{n}$ p to develop in $E_k$;

said flange engaging said $E_k$ in a manner compelling fluid flow out of $E_k$ in either direction in the loop, said flange depressing $E_k$ such that when its wall is fully depressed said applied force is sufficient to develop the fluid-contributed portion f of the reaction to said applied force and to limit to a tolerable level fluid leakage past the flange to its low pressure side, said f being given by $$\int_{S'} \int (p - p'_a + p_e) n \cdot u \, dS' + \int_{S''} \int (p_o - p'_a + p_e) \cdot n \cdot u \, dS''$$

approximately, where S' and S'' denote that portion of said surface area lying on the high and low pressure side, respectively, of said fully depressed wall, f is at least a portion of said F, the reaction to the difference between f and F being balanced by means other than fluid pressure, $\hat{u}$ and $\hat{n}$ are unit vectors along the line of action of said $\vec{F}$ and along the normal to S, respectively, being taken as positive when drawn outward from S, and p, S, $\hat{u}$ and $\hat{n}$ may be functions of position and time;

said $E_k$ and said impulse having sufficient size, and said $E_k$ and said means of impulse delivery having geometry, engagement means, and safety features such that during said impulse said pressure p in $E_k$ while not becoming too large becomes large enough to cause sustained flow of a quantity of fluid out of $E_k$ into and through said conduit $C''$ to said actuator at which said pressure p developed at the impulse-producing station of $E_k$ has been reduced by lost head between stations to p' which is greater than said $p'_o$ and the quantity of fluid flow due to impulses initiated at $E_k$ and the corresponding pressure pulse pattern developed are sufficient to operate said actuator, said flow continuing therefrom into said conduit $C'$ where, installed on a tee-connection therefrom on the outflow side of said actuator, a suitable fluid accumulator having static pressure $p_o$ serves as a fluid reservoir and also to accumulate and release fluid as required during $E_k$'s deformation and recovery, respectively, for return to said $E_k$, the head lost across said actuator being said p' less $p'_o$ where $p'_o$ is greater than said $p_o$ and $p'_o$ less said $p_o$ is approximately the heat lost between the outflow side of the actuator and the fluid return station in $E_k$; and motion of the train removing said flange so that said loss of volume in said $E_k$ can be recovered resiliently and by net outward fluid pressure on the inner wall surface of $E_k$, said quantity of fluid flowing out of $E_k$ into said conduit $C''$ being replaced by an equivalent amount flowing in from said conduit $C'$, and the cycle of deformation and recovery of $E_k$ continued in an arbitrary time sequence of discrete impulses where the time interval between successive impulses is greater than the recovery time of $E_k$.

8. In a device as recited in claim 7, said accumulator located in a shunt conduit across said actuator, the actuator being reversible and the shunt having flow control means such that fluid interchange between the accumulator and said loop occurs only on the outflow side of the actuator.

9. In a device as recited in claim 7, each of said directions leading to means for achieving unidirectional fluid flow through said actuator, the actuator being nonreversible.

10. In a device as recited in claim 1, 2, 3, 5, 9, 4, 6 or 7, a plurality of said $E_k$ structured, shaped, emplaced, and distributed to accommodate said discrete impulses, and interconnected by a system of valves and conduits for controlling and routing the attendant discrete impulse fluid power to suitable storage or direct utilization factilities.

* * * * *

UNITED STATES PATENT AND TRADEMARK OFFICE
CERTIFICATE OF CORRECTION

PATENT NO. : 4,700,540

Page 1 of 3

DATED : October 20, 1987

INVENTOR(S) : Barney L. Byrum

It is certified that error appears in the above-identified patent and that said Letters Patent is hereby corrected as shown below:

Abstract page, 1st column, line 3, delete Baney and insert --Barney--.
Column 3, line 40, delete "drawing" and insert --driving--.
Column 4, line 42, delete "because" and insert --becomes--.
Column 5, line 42, after "incremental" insert --distance--.
Column 5, line 46, before " insert --p--.
Column 6, line 60, delete e and insert --the--.
Column 7, line 29, after "symbol" insert -- ▷ --.
Column 7, line 45, delete $F_i$ and insert --$V_i$--.
Column 8, line 5, delete "of" and insert --or--.
Column 9, line 18, delete "various" and insert --variance--.
Column 9, line 24, delete the 3 uses of $\vec{v}$ and insert --v--.
Column 9, line 33, delete $\underline{P}$ and insert --$\overline{P}$--.
Column 9, line 51, Eq. (1), delete $\vec{v}$ and insert --v--.
Column 10, lines 16 & 18, Eq. (3), delete the 4 uses of $\vec{v}$ and insert --v--.
Column 10, line 30, before "shape" insert --the same--.
Column 11, line 24, delete $\vec{v}$ and insert --v--.
Column 11, line 25, delete $\vec{v}$ and insert --v--.
Column 11, line 26, delete $\vec{v}$ and insert --v--.
Column 11, line 42, Eq. (4), delete 2 uses of $\vec{v}$ and insert --v--.
Column 11, line 45, delete $\vec{v}$ and insert --v--.
Column 11, line 65, delete n and insert --$\hat{n}$--.
Column 11, line 67, delete n and insert --$\hat{n}$--.
Column 12, line 3, delete n·u and insert --$\hat{n}·\hat{u}$--.
Column 12, line 12, delete the 2 uses of n and insert --$\hat{n}$--.
Column 12, line 12, after "symbol" insert -- ∧ --.
Column 12, line 26, delete 15 and insert --13--.
Column 13, line 29, Eq. (14), after $\sqrt{R}$ insert the integral sign -- ∫ --.
Column 13, lines 58 & 60, square the expressions in parentheses.
Column 14, line 58, Eq. (27), delete 12 and insert --21--.
Column 15, line 6, Eq. (31), delete the 1 that looks like a superscript to the e.
Column 15, line 51, delete p = np and insert --$\vec{p} = \hat{n}$ p--.

UNITED STATES PATENT AND TRADEMARK OFFICE
CERTIFICATE OF CORRECTION

PATENT NO. : 4,700,540

DATED : October 20, 1987

INVENTOR(S) : Barney L. Byrum

It is certified that error appears in the above-identified patent and that said Letters Patent is hereby corrected as shown below:

Column 15, line 64, delete n and insert --$\hat{n}$--.

Column 15, lines 66 & 67, delete "being" and insert --having--.

Column 16, line 65, delete = np and insert --$\vec{p} = \hat{n}\, p$--.

Column 19, line 47, delete the 2 uses of n · u and insert --$\hat{n} \cdot \hat{u}$--.

Column 20, line 2, delete n and insert --$\hat{n}$--.

Column 20, line 49, before 9 insert --8,--.

At the end of the specification, insert Tables 1 and 2 as shown on the attached sheet.

Signed and Sealed this

Fifth Day of July, 1988

Attest:

DONALD J. QUIGG

Attesting Officer

Commissioner of Patents and Trademarks

TABLE 1

Pressure-Weight Relations 60 MPH Case

| a, in. | $I(a,R)$, in$^2$ | $p_v$, lbs/in$^2$ | $p_w$, lbs/in$^2$ | w, lbs | w', lbs |
|---|---|---|---|---|---|
| 0.25 | 1.479483 | 1.773 | 116.5 | 150.6 | 165.6 |
| 0.50 | 4.152730 | 28.37 | 143.1 | 533.1 | 586.4 |
| 0.75 | 7.570100 | 143.6 | 258.3 | 1844 | 2029 |
| 1.00 | 11.56358 | 453.9 | 568.6 | 6405 | 7045 |
| 1.25 | 16.03207 | 1108 | 1223 | 19370 | 21300 |
| 1.50 | 20.90476 | 2298 | 2413 | 50130 | 55140 |

TABLE 2

Pressure-Weight Relations 15 MPH Case

| $p_v$, lbs/in$^2$ | $p_w$, lbs/in$^2$ | w, lbs | w', lbs |
|---|---|---|---|
| 0.1108 | 114.8 | 148.1 | 162.9 |
| 1.773 | 116.5 | 422.6 | 464.9 |
| 8.975 | 123.7 | 825.0 | 907.5 |
| 28.37 | 143.1 | 1484 | 1633 |
| 69.25 | 184.0 | 2713 | 2985 |
| 143.6 | 258.3 | 5093 | 5602 |